United States Patent [19]

Freeman et al.

[11] Patent Number: 5,871,846
[45] Date of Patent: Feb. 16, 1999

[54] SILANE-TREATED CLAY PRODUCTION METHOD, SILANE-TREATED CLAY AND COMPOSITION CONTAINING SAME

[75] Inventors: Gary M. Freeman; Carl J. Marshall, Jr.; Walter O. Lackey, all of Macon, Ga.; Masao Onizawa, Omiya, Japan

[73] Assignees: J.M. Huber Corporation, Edison, N.J.; Sanyo Trading Company, Ltd., Tokyo, Japan

[21] Appl. No.: 827,578

[22] Filed: Mar. 28, 1997

[30] Foreign Application Priority Data

Sep. 2, 1996 [JP] Japan .................................. 8-232369

[51] Int. Cl.$^6$ .............................. B32B 19/00; C09C 1/42; C04B 33/04
[52] U.S. Cl. .......................... 428/405; 428/403; 106/468; 106/487; 501/148; 523/212
[58] Field of Search ..................... 428/403, 405; 106/468, 487; 501/148

[56] References Cited

U.S. PATENT DOCUMENTS

| | | | |
|---|---|---|---|
| 3,227,675 | 1/1966 | Papalos .................................. | 524/114 |
| 3,738,948 | 6/1973 | Dunnom .................................. | 523/514 |
| 3,957,718 | 5/1976 | Pochert et al. .......................... | 524/723 |
| 4,014,827 | 3/1977 | Hart et al. ............................... | 524/440 |
| 4,069,220 | 1/1978 | Orem et al. ............................. | 544/186 |
| 4,075,153 | 2/1978 | Leo ........................................ | 523/415 |
| 4,311,628 | 1/1982 | Abdou-Sabet et al. ................. | 514/171 |
| 4,511,697 | 4/1985 | Sohnemann ............................ | 525/139 |
| 4,525,281 | 6/1985 | Cooper ................................... | 210/735 |
| 4,659,765 | 4/1987 | Liu et al. ................................ | 524/447 |
| 4,677,141 | 6/1987 | Cornelius et al. ...................... | 523/203 |
| 4,714,733 | 12/1987 | Itoh et al. ............................... | 524/493 |
| 4,782,106 | 11/1988 | Fricke et al. ............................ | 524/413 |
| 4,810,578 | 3/1989 | Prescott et al. ......................... | 428/405 |
| 4,929,512 | 5/1990 | Nishimura et al. ..................... | 428/610 |
| 4,937,104 | 6/1990 | Pühringer ............................... | 427/344 |
| 4,987,939 | 1/1991 | Yamada et al. ......................... | 152/556 |
| 5,008,305 | 4/1991 | Kennan et al. ......................... | 523/212 |
| 5,030,692 | 7/1991 | Durairaj ................................. | 525/134 |
| 5,082,886 | 1/1992 | Jeram et al. ............................ | 524/403 |
| 5,116,886 | 5/1992 | Wolff et al. ............................. | 523/209 |
| 5,178,676 | 1/1993 | Lackey et al. .......................... | 501/148 |
| 5,227,425 | 7/1993 | Rauline ................................... | 524/493 |
| 5,244,958 | 9/1993 | Goodman ............................... | 524/447 |
| 5,318,681 | 6/1994 | Murase et al. .......................... | 523/212 |
| 5,591,794 | 1/1997 | Fukumoto et al. ..................... | 524/447 |

OTHER PUBLICATIONS

V.M. Gorshkov et al., "Resin Mixt. Useful for Rubberised Rollers in Textile Industry—Comprises Butadiene Styrene and Polyisoprene Rubbers with Kaolin and Special Silica Filler, for Improved Uniform and Smooth Milled Fabric", Abstract No. RU 2033006, Sep. 20,1995.

"Heat Resistant Belt with Teeth—in Which Bottom Convas of Belt is Bonded with Adhesive Compsn. Contg. Hydrogenated Nitrile Rubber", Abstract No. JP1058831, Mar. 6, 1989.

A. Arefeva et al., "Diene Rubber Based Vulcanisate Compsn.—Contains Rubbber, Resorcinol—Tetra Amine, Zinc Oxide, Straearin, Sulphur, Sulphenamide Contg. Accelerator and Aminated Carbon", Abstract No. Su 1219606, Mar. 23, 1986.

A.A. Delektorsk, Vulcanizing Unsatd. Synthetic Rubber Compsn.—Contg., Diene Rubber—Modified with Complex of Tretra Methyelen Dietjylene Amine and Recorcinol, Abstract No. SU 981324A. Dec. 17, 1982.

Rubber Compsn. for Adhesion to Steel Cord–Comprises Synthetic Polyisoprene, Another Rubber and Cobalt Salt of Organic Acid and/or Formaldehyde, Recsorcinol, Adhesion, Accelerator, Abstract No. JP 54052188A, Apr. 24, 1979.

S. Borgmann, Rubber Composite Articles Prodn. –with Addn. of Homogenous Adduct Comprising Resorcinol—Hexa Methylene Tetramine Crosslinker Absorbed on Zeolite or Silcate Layer, Abstract No. DD276295, Feb. 21, 1990.

Producing Hydrophobic Inorganic CPD Fine Particles–Includes Preparing AQ Dispersion of Inorganic CPD Fine Particles Contg. Surfactant, Adding Tri Alkoxy—Silane to Disperison, Abstract No. JP06285363, Oct. 11, 1994.

*Primary Examiner*—Tae Yoon
*Attorney, Agent, or Firm*—Dickinson Wright PLLC

[57] ABSTRACT

An effective production method for silane-treated clays having exceptional reinforcing effects with respect to rubber, and compositions using these silane-treated clays are offered. With the silane-treated clay production method, a functional silane is predispersed or emulsified in water by means of a surfactant in order to mix the functional silane with kaolin clay and thereby uniformly surface-treat the kaolin clay with the functional silane. The surfactant should preferably be a non-ionic surfactant with an HLB value in the range of 8–18. The silane-treated clay formed by surface-treating kaolin clay by means of these functional silanes characteristically contains low residual levels of the non-ionic surfactants. The functional silanes can be either vinyl or sulfur functional silanes. The silane treated clays are useful as fillers or extenders in rubber compositions, particularly those employing silicas and/or carbon blacks.

29 Claims, No Drawings

SILANE-TREATED CLAY PRODUCTION METHOD, SILANE-TREATED CLAY AND COMPOSITION CONTAINING SAME

FIELD OF THE INVENTION

The present invention is directed to silane-treated clays for use in natural or synthetic rubber systems as a reinforcing filler or extender.

BACKGROUND ART

In the prior art, the use of silane treated clays as fillers for polymers or elastomerics is known. Typically, treated clays employing sulfur functional silanes are utilized in sulfur cured elastomeric systems requiring properties such as high tensile strength, high modulus or the like. Sulfur cured elastomers are often found in automotive applications such as tires, i.e., carcass, tire tread and white side walls, belts, hoses or the like.

Peroxide cured elastomeric systems are often used in jacketing applications, such as for wire and cable, and in specialty goods such as gaskets. Typically, these types of elastomeric systems seek good compression set properties. Vinyl functional silanes have been used in these applications.

With ever increasing competition in the elastomer industry, more and more applications are being developed which need high levels of reinforcement, either in terms of modulus, tensile strength, tear or compression set. To date, silica or carbon black fillers have been the only types of fillers which could provide the desired level of reinforcement. However, both of these filler systems are not without their disadvantages. Carbon black generally cannot be used in applications wherein the elastomer compound needs to be pigmented (i.e., white or non-black). In addition, a very fine particle size carbon black is needed to provide high levels of reinforcement and these carbon blacks can be extremely expensive. Further, in many tire related applications carbon blacks are known to contribute to higher heat build-up properties, as compared to clays, which can have deleterious effects on the service life of the tire.

Using a precipitated or fumed silica as a filler also contributes greatly to the cost of the compound since these silicas are often extremely expensive on a per pound basis. Moreover, they are difficult to process in elastomeric systems. Since silica fillers have extremely high surface areas, they are highly absorptive. When mixed with a given elastomeric compound, the silicas tend to absorb the oils, plasticizers or the like in the compound and make it difficult to mix the compound. This characteristic can often lead to poor filler dispersion thereby reducing expected physical properties. The use of high levels of precipitated silica in tire tread compounds provides excellent rolling resistance properties, but it is also known to cause the build-up of undesirable static charge such that they require the co-use of other semi-conductive fillers. Ideally, these replacement fillers should have virtually no deleterious effects on rolling resistance and rubber physical properties as compared to silica.

However, if one were seeking to produce a non-black elastomeric compound having a high level of reinforcement, silica and its attendant disadvantages would be the only choice. Carbon black cannot be used due to the need for pigmentation or color in the compound.

Silicas have been combined with various silanes for use in elastomer systems. U.S. Pat. No. 5,008,305 to Kennan et. al. describes a reinforcing silica for use in silicone elastomers. The reinforcing silica is prepared by treating the dry silica with a combination of both phenylalkoxysilane and vinylalkoxysilane. This combination of surface treatment improves compression set and heat aging in silicone elastomers. This art differs from the present invention in that Kennan et. al. use a silica as the reinforcing agent and that both phenyl and vinyl functional silanes are added to the silica in pure form rather than as emulsions. Further, both phenyl and vinyl functional silanes are required in the prior art composition as opposed to the use of a single functional silane for surface treatment in the present invention. Lastly, it is required that these silanes be volatile in order to observe the benefits. Volatility is unimportant in the present invention.

U.S. Pat. No. 4,714,733 describes a rubber composition containing an ethylene-propylene rubber, an organopolysiloxane having at least two alkenyl groups per molecule, a silica filler, an alkoxysilane, and a thiocarbamyl-containing organosilane. This prior art composition exhibits improved compression set and heat aging. This composition differs from the present invention in that the prior art requires the use of a thiocarbamyl-containing organosilane and the filler is a silica, not a surface treated kaolin clay.

Heretofore, silane treated clays have had limited utility in elastomeric applications requiring high performance because of their relatively low reinforcing benefits. Their ability to replace or extend high performance fillers, such as carbon black or silica, has been modest at best. Known silane treated clays for use in elastomer systems not requiring high performance include the Nucap™ and Nulok™ clays manufactured by J. M. Huber Corporation of Macon, Ga. The Nucap™ silane treated clays use a sulfur functional silane in treatment levels up to about 0.5% by weight of the silane based on dry clay. Exemplary of these sulfur functional silanes include a mercaptosilane, a thiocyanatosilane or a bridging tetrasulfane silane. The Nucap™ treated clays are therefore mainly targeted for use in sulfur-cured rubber systems. In comparison, the Nulok™ treated clays utilize various amino functional silanes in treatment levels up to about 1.0% by weight and these fillers are mainly used in peroxide-cured compounds. These Nucap™ and Nulok™ products, and their competitive counterparts, can be based on kaolin clay substrates ranging from fine particle size waterwashed clays, to waterwashed delaminated clays of relatively coarse particle size to various airfloat clays.

Up to the present, it was well recognized that increasing the amount of sulfur functional silanes on the clay did not necessarily increase the given performance of a given elastomeric system in a proportional manner. Diminishing incremental performance benefits are provided as silane treatment levels are increased. Thus, the silane treatments have been held to the levels noted above, e.g., about 0.5% by weight and below based on cost/performance considerations.

Besides the inability to provide a high level of performance in elastomeric systems, clay or current treated clays have also presented a problem in regards to their inherent higher specific gravity than that of silica or carbon black. The specific gravity of kaolin clay is 2.6 whereas the specific gravity of silica is about 2.0 to 2.2. Carbon black's specific gravity is about 1.8. In rubber compounds where density is critical, a treated clay cannot be substituted for carbon black or silica on a one to one weight basis while still meeting the density requirements. In other words, less clay must be used than a given phr amount of carbon black or silica to meet the density requirement. In addition, the reduced weight amount of clay must still be able to impart the same filler performance characteristics as the carbon black or silica. Conversely, if the filled rubber compounds are to be formulated to yield equal hardness then about 1.6 parts of clay or treated clay are normally required to replace every 1 part of carbon black while needing to still maintain other physical properties like modulus, tensile strength and tear. At a weight ratio of 1.6/1, this puts treated clays at a cost/performance disadvantage as extenders for larger particle size of soft carbon blacks unless the silane treated clays provide a very high level of performance.

In view of the disadvantages noted above with presently available silane treated clay products as well as the limitations of silica and carbon black as fillers in elastomeric systems, a need has developed to provide a silane treated clay product which can be used as a highly effective reinforcement for elastomeric systems.

The present invention solves this need by providing a method of making a silane treated clay and product therefrom which can be used as a reinforcing filler or extender in elastomeric systems to achieve high performance characteristics. The silane treated clays of this invention can be made by first emulsifying the functional silane prior to surface treating the clay.

Silanes have been used in dispersed or emulsified form in applications other than those employing clays.

Patent JP-06285363 describes the production of hydrophobic fine particles of an inorganic compound (more specifically particles of TiO2 pigment) by combining an aqueous dispersion of the inorganic compound with surfactant and alkylsilane for the purpose of obtaining a silicone polymer coating on the surface of fine powders. While the above patent describes a hydrophobic inorganic fine particle composition and a process to produce such a composition, the compositions of this present invention differ from the above by our demonstrated examples of unexpectedly high gains in cured elastomer reinforcing properties using significantly lower levels of silane treatments which are outside the scope of this prior art. In addition, the focus of this prior art was on the use of non-functionalized alkylsilanes as opposed to the functional silanes utilized in the present invention.

The technique of using an amino functional silane emulsion to treat an aqueous mineral slurry is described in U.S. Pat. No. 4,525,281. The treated mineral has improved dewatering properties. As with the current invention, a mineral is treated with a silane emulsion. However, the effective silanes of this present invention are not amino functional silanes, but rather vinyl and sulfur functional silanes which are required to chemically interact with both the kaolin clay and the elastomer, The unexpectedly high elastomer reinforcement benefits of the current invention could not have been predicted from the dewatering benefit described by the prior art.

A silane emulsion is described in U.S. Pat. No. 4,937,104 which is useful for making building material surfaces hydrophobic. The emulsion consists of alkyltrialkoxysilane in aqueous alcohol. Although this prior art and the current invention use silane emulsions for surface treatment, the current invention requires functional silanes to achieve the reinforcing properties in elastomers. Further, the observed hydrophobicity benefit in the prior art is unrelated to the reinforcing properties observed in the current invention.

SUMMARY OF THE INVENTION

Accordingly, it is a first object of the present invention to provide a silane treated clay product which can be used as a reinforcing filler or extender for elastomeric systems. The silane-treated clay of the present invention is especially well suited to use as a reinforcing filler for natural and synthetic rubbers because the available pendant functional group (a vinyl or sulfur containing group) on the silane-treated clay chemically reacts with the rubber polymer backbone during the curing process to yield cross-linking between the clay and the polymer. Synthetic rubber, isoprene rubber (IR), nitrile butadiene rubber (NBR), ethylene-propylene rubber (EPDM), styrene butadiene rubber (SBR) and polybutadiene rubber (BR) are examples of different rubbers that can be reinforced with the inventive silane treated clay.

Another object of the present invention is to provide silane treated clay products that yield superior filler reinforcement properties in rubber relative to conventional treated clays (like the various Nucap™ and Nulok™ clays). The performance benefits to be provided include higher tensile strength, modulus and tear properties or improved compression set depending on the particular clay/silane combination used with a given natural or synthetic rubber polymer. Hence, a further object of the invention is to provide high performance treated clays having the ability to totally or partially replace soft carbon black or silica fillers in various elastomeric applications on a cost/performance basis. The ability to provide carbon black like performance properties in white or non-black rubber applications is greatly desired. Yet another object of the invention is to provide treated clay products of high performance for use in sulfur cured and in peroxide cured elastomer systems. Another particularly novel aspect of this invention is the development of a silane treated clay filler based on pendant thiocyanate functionality that has essentially equal rubber reinforcement utility when using either cure system (sulfur or peroxide).

Another object of the present invention is to provide a method of making a silane-treated clay product of high silane treatment level that is useful for high performance elastomeric systems.

A further object of the present invention is to utilize a hydrous kaolin clay as the clay starting material and either a sulfur functional silane or a vinyl functional silane in combination with the hydrous kaolin clay. The treatment level of sulfur functional silane can vary between 0.7 to 5.0% by weight of silane based on dry clay. The vinyl functional silane amount varies from 0.2 to 5.0% by weight of silane based on dry clay. Preferably, the vinyl and sulfur functional silanes range in treatment level between 1.0 and 2.0% by weight of dry clay.

The clay starting material can be in the form of an aqueous slurry, a dry clay or a wet crude clay for silane treatment. For slurry treatment, it is preferred that the clay be in the form of a dispersed filter cake slurry of essentially neutral pH when treated with the silane. Preferably, the desired silane is in the form of an aqueous emulsion when added to the clay slurry to insure proper dispersion upon mixing with the clay so as to yield good surface treatment uniformity. For dry clays, it is preferred that the dry clay be charged to a solids/liquid mixer followed by addition of the silane under vigorous mixing conditions. For wet crude clays having a moisture content of about 20%, it is preferred that the crude clay is first pulverized to a small aggregate size and then conveyed into a mixer such as a pin mixer for combining with the silane prior to drying, milling and air classifying to a finished product. This crude clay treatment process is particularly preferred for use in the production of silane treated air-float clay products. In both cases, the silane is again preferably in the form of an aqueous emulsion when mixed with the clay (dry or wet crude form) to insure proper wetting of the clay's surface with the treatment agent so as to yield good surface treatment uniformity. Hence, another object of the present invention is to provide a method that allows for higher and more effective silane treatment levels to be applied to clays for producing a highly reinforcing treated clay product. This object has been accomplished through the development and use of the silane treatment agents in emulsified form. Therefore a further object of the invention is to provide a method of preparing stable aqueous emulsions of sulfur functional silanes as well as vinyl functional silanes for subsequent use as clay surface treatment agents. Finally, the ability to homogeneously treat waterwashed kaolin clays in slurry form with such silane emulsions is another object of this invention.

Other objects and advantages of the present invention will become apparent as a description thereof proceeds.

In satisfaction of the foregoing objects and advantages, the present invention, in its broadest embodiment, comprises a clay which is surface treated with either a sulfur functional silane at a treatment level of 0.7 to 5.0% by weight of the active silane based on dry clay or a vinyl functional silane having 0.2 to 5.0% by weight of active silane based on dry clay. The clay is preferably a hydrous kaolin clay made by waterwashing or air classification techniques. The sulfur functional silane treated clays are preferred for use in elastomeric systems requiring high levels of tensile strength or high modulus. The vinyl functional silane treated clays are preferred in elastomeric applications desiring good compression set. The silane treated clays can be used as a total or partial replacement for fillers such as silica or carbon black in elastomeric systems. The amount of silane treated clay filler employed in a compound will depend on the desired system characteristics such as density, hardness, modulus at 300% elongation, tensile strength, tear, compression set or the like; however, useful filler loadings for these silane treated clays in natural or synthetic rubbers typically range from 10–150 parts by weight of silane treated clay with respect to 100 parts by weight of rubber polymer (i.e., 10–150 phr).

PREFERRED EMBODIMENTS OF THE INVENTION

In one mode, the production method of silane treated clay of the present invention is a method wherein a kaolin clay slurry and a functional silane are mixed together with the functional silane having been predispersed or emulsified via high speed dispersion in water by means of surfactants, and treating the surface of the kaolin clay with the functional silane upon heat-drying the mixture.

Functional silanes are silicon-containing compounds which include, within a single molecule, one or more hydrolytic groups which generate silanol groups which can form covalent bonds with the surface hydroxyls of the kaolin clay by means of condensation, and a functional group which can form bonds with surrounding organic matrices. The above-mentioned hydrolytic group can be a methoxyl group, an ethoxyl group or the like. Typically, the functional silanes of greatest utility in this invention will contain 2 or 3 alkoxy type groups. These alkoxy groups are hydrolytically decomposed in the presence of water, (e.g., water contained in the kaolin clay slurry or moisture adhering to the surface of the kaolin clay) thereby forming silanol groups and liberating the corresponding alcohol. The functional silanes modify the surface of the kaolin clay by means of chemical bonds which these silanol groups form with the surface hydroxyls of the kaolin clay. The above-mentioned functional group can be a vinyl group or other ethylene-type double bond, a mercapto group, a thiocyanato group, a bridging tetrasulfane group, or other sulfur functional group. Additionally, the silane may have an alkyl group such as a methyl group, an ethyl group or a propyl group.

Silanes which contain at least an ethylene-type double bond or a sulfur atom, such as mercaptosilane, thiocyanatosilane, vinylsilane, and disilyl tetrasulfane are preferable for use in the production method of the present invention. Methacrylsilanes can also be used in the present invention, but are less preferred versus vinylsilanes because of cost consideration. After the silane has been mixed into the kaolin clay, a silane-treated clay is obtained when the resulting silanol groups reach the kaolin silicate layer to undergo a chemical reaction with the surface hydroxyls of the kaolin clay. Then, pendant mercapto groups, thiocyanate groups, vinyl groups or tetrasulfane groups provided on the surface of the silane-treated clay are able to form a bridging, cross-linking reaction with rubber and the like when cured. Consequently, the silane treated clay has a good affinity towards rubber, thus having exceptional strength with respect to rubber and the like. Examples of silanes of this type are the mercaptosilane, thiocyanatosilane and vinylsilane types represented by the following Formula 1 and the disilyl tetrasulfane type represented by the following Formula 2:

$$(RO)_2R'—Si—X \qquad (1)$$

(wherein R represents a methyl group or an ethyl group, R' represents a methyl group, an ethyl group, a methoxyl group or an ethoxyl group, and X represents a vinyl group, a 3-mercaptopropyl group or a 3-thiocyanatopropyl group)

$$(RO)_3—Si—(CH_2)_3—SSSS—(CH_2)_3—Si—(OR)_3 \qquad (2)$$

(wherein R represents a methyl group or an ethyl group).

A specific example of a suitable mercaptosilane is 3-mercaptopropyl trimethoxysilane, a specific example of a suitable thiocyanatosilane is 3-thiocyanatopropyl triethoxysilane; specific examples of suitable vinylsilanes are vinyltrimethoxysilane and vinyltriethoxysilane, and a specific example of a disilyl tetrasulfane is bis(3-triethoxysilylpropyl) tetrasulfane.

The above-mentioned silanes, particularly the thiocyanato and tetrasulfane silanes, are generally difficult to dissolve or disperse in water because of their organophilic nature. By emulsifying these silanes in water by means of high speed dispersion with surfactants and then mixing the emulsified silanes with kaolin clay, the silanes can be more intimately mixed with the clay particles and made to uniformly coat and adhere to the surface of the kaolin clay for subsequent bonding upon drying (the clay particles themselves being inherently hydrophilic in nature). As a result, the surface of the kaolin clay is uniformly surface-treated after spray-drying, so that the silane-treated clay product has exceptional quality and uniformity. In the absence of using silane emulsions for the surface treatment of kaolin clays, the ability to apply uniformly coated treatments at high silane treatment levels (i.e., silane additions of about 0.7% by weight of clay or greater) becomes increasingly more difficult. In addition, greater silane losses due to the apparent volatilization of the treatment chemical during the product drying step have been noted when using high treatment levels of non-emulsified silane. Non-uniform treatment of the functional silanes results in reduced performance benefits given the advent of clay filler areas having no surface treatment and other areas having a less effective multi-layer coating of treatment. It is believed that silane losses and non-uniform coating of silane treatments onto clay, such as with the sulfur functional silanes, has been largely responsible for the commercially viable filler products in commerce today having been previously limited to relatively low treatment levels of<0.7% because the rubber performance gained at higher levels of silane treatment was not cost effective on the basis of the small additional performance benefit obtained relative to the increased cost. In summary, the ability to apply uniform silane surface treatments onto clays (per the teachings of this invention) has now allowed cost effective treated clays of high treatment level to be developed which function as highly reinforcing fillers for natural or synthetic rubber polymers.

With the present invention, the silanes are high speed dispersed in water with the aid of surfactants and then mixed into kaolin clay in this state. The silanes are emulsified into water containing surfactants, which behave as wetting agents and emulsifiers. As surfactants for use in this case, it is preferable that the surfactants have HLB (hydrophilic/lipophilic balance) values of 8–18. Non-ionic surfactants are especially preferable as surfactants. Non-ionic surfactants allow silanes to be easily dispersed in water and form particularly stable silane emulsions wherein it is believed that the functional silane is in a partially hydrolyzed form. The formation of stable silane emulsions is particularly advantageous because premature self-condensation of the partially hydrolyzed functional silane into silicone-like oligomers has been frequently noted to decrease the expected reinforcing benefits of the silane treatment. It should also be noted that the pH at which the silane/non-ionic surfactant emulsion was prepared is very important to resultant silane emulsion stability as the hydrolysis of alkoxy based silanes are well known to be acid or base promoted. Additionally, the presence of residual non-ionic surfactants in the finished silane-treated clay product will not affect the processability or quality of the rubber. Non-ionic surfactants include ether-types and ester types which have polyoxyethylene or polyhydric alcohols and the like as their hydrophilic groups. Examples of non-ionic surfactants are polyoxyethylene alkyl ethers, polyoxyethylene fatty acid esters, polyoxyethylene alkylphenyl ethers, polyhydric alcohol fatty acid esters, and polyoxyethylene polyhydric alcohol fatty acid esters.

More specific examples of suitable non-ionic surfactants are polyoxyethylene alkyl ethers such as ethoxylated tridecyl alcohol, polyoxyethylene alkylphenyl ethers such as 9-EO ethoxylated nonylphenol, 15-EO ethoxylated nonylphenol, 20-EO ethoxylated nonylphenol and 20-EO ethoxylated octylphenol; polyoxyethylene polyhydric alcohol fatty acid esters such as 5-EO ethoxylated sorbitan mono-oleate and PEG-20 sorbitolmonolaurate, PEG-12 dioleate, and PEG-16 hydrogenated castor oil. These non-ionic surfactants have HLB values of 8–18.

These non-ionic surfactant compounds which have oxyethylene bonds (—$CH_2CH_2O$—) as hydrophilic groups leave residues of approximately 10 ppm–5000 ppm in the finished silane-treated clay. These surfactant amounts are small enough not to influence the quality of the clay filled rubber compositions. Typically, the amount of non-ionic surfactant used to prepare a 50% active emulsion of an organosilane is about 5% by weight of the total silane content. With regard to the present invention, compounds having oxyethylene bonds refer to non-ionic surfactants having oxyethylene bonds or reactants of these non-ionic surfactants with silanes.

The pure theoretical chemical composition of hydrous kaolin clay can be represented by the formula $Al_2O_3.2SiO_2.2H_2O$, and its specific gravity is approximately 2.60. It should be noted that kaolin clay is the mineral kaolinite and being a naturally occurring mineral substance it contains other ingredients in small but varying amounts. There is no particular restriction on the type of kaolin clay to be used in the production method of the present invention. However, it is preferable that sedimentary clays such as kaolin clay from the Tertiary clay layer in eastern Georgia, the Cretaceous clay layer in middle Georgia or a clay layer in South Carolina be used. These kaolin clays result in silane-treated clays which have especially good reinforcing effects with respect to rubber. Aside from having specific physical properties, these sedimentary clays have excellent particle size and shape characteristics and result in highly workable rubber compositions.

Generally, kaolin clays have a unique chemical composition, unique chemical properties and unique particle morphology depending upon the origin thereof. The fine particle size waterwashed kaolin clays taken from the Tertiary layer in east Georgia have a typical oxide composition represented by 0.4–1.0% by weight of $TiO_2$, 0.8–1.5% by weight of $Fe_2O_3$, 38.4–39.4% by weight of $Al_2O_3$, 44.8–45.9% by weight of $SiO_2$, 0.02–0.42% by weight of $Na_2O$, 0–0.19by weight of $K_2O$, and 0–0.03% by weight of CaO, with an ignition loss (at 1000° C.) of 13.4–14.0% by weight.

When this kaolin clay is silane-treated, the resulting silane-treated clay has a median Malvern particle size of 0.4–1.0 $\mu$m and a BET surface area of 19–23 $m^2$/g. Additionally, a Sedigraph particle size analysis shows that the silane treated clay has a particle size distribution such that particles having particle sizes of greater than 5 $\mu$m make up less than 3% by weight, particles having particle sizes of less than 2 $\mu$m make up over 90% by weight, particles having particle sizes of less than 1 $\mu$m make up over 80% by weight, particles having particle sizes of less than 0.5 $\mu$m make up over 70% by weight, and particles having particle sizes of less than 0.2 $\mu$m make up less than 50% by weight of the silane-treated clay.

Airfloat kaolin clays taken from the South Carolina crudes have a typical chemical oxide composition represented by 1.0–2.0% by weight of $TiO_2$, 1.0–2.2% by weight of $Fe_2O_3$, 37.3–39.3% by weight of $Al_2O_3$, 44.4–46.4% by weight of $SiO_2$, 0–0.18% by weight of $Na_2O$, 0.03–0.63% by weight of $K_2O$, and 0–0.22% by weight of CaO, with an ignition loss (at 1000° C.) of 13.4–14.0% by weight.

When this kaolin clay is silane-treated, the resulting silane-treated clay has a median Malvern particle size of 1.9–2.9 $\mu$m and a BET surface area of 22–26 $m^2$/g. Additionally, a Sedigraph particle size analysis shows that the silane-treated clay has a particle size distribution such that particles having particle sizes of greater than 5 $\mu$m make up less than 8% by weight, particles having particle sizes of less than 2 $\mu$m make up over 80% by weight, particles having particle sizes of less than 1 $\mu$m make up over 70% by weight, particles having particle sizes of less than 0.5 $\mu$m make up over 60% by weight, and particles having particle sizes of less than 0.2 $\mu$m make up less than 50% by weight of the silane-treated clay.

Waterwashed delaminated kaolin clays taken from the Cretaceous layer in middle Georgia have a typical chemical oxide composition represented by 0.4–1.2% by weight of $TiO_2$, 0.2–0.7% by weight of $Fe_2O_3$, 36.9–39.9% by weight of $Al_2O_3$, 44.8–45.8% by weight if $SiO_2$, 0–0.38% by weight of $Na_2O$, 0.01–0.21% by weight of $K_2O$ and 0–0.22% by weight of CaO, with an ignition loss (at 1000° C.) of 13.3–13.9% by weight.

When this kaolin clay is silane-treated, the resulting silane-treated clay has a median Malvern particle size of 5.0–6.0 μm and a BET surface area of 11–15 m$^2$/g. Additionally, a Sedigraph particle size analysis shows that the silane-treated clay has a particle size distribution such that particles having particle sizes of greater than 5 μm make up less than 15% by weight, particles having particle sizes of less than 2 μm make up over 60% by weight, particles having particle sizes of less than 1 μm make up over 40% by weight, particles having particle sizes of less than 0.5 μm make up over 20% by weight, and particles having particle sizes of less than 0.2 μm make up less than 5% by weight of the silane-treated clay.

The Malvern particle size measurement method is a laser light scattering method, wherein the particle size properties of kaolin clay are determined on dilute aqueous dispersions and the data is analyzed on the basis of Mie scattering and Fraunhofer diffraction theory. The Malvern median particle size values reported herein were measured using Malvern's Mastersizer/E particle size unit.

The sedigraph particle size measurement is a particle sedimentation method based on Stokes Law, wherein the particle size properties of kaolin clay are determined on dilute aqueous dispersions. The sedimentation data is collected and analyzed by a Micromeritics 5100 X-ray sedigraph particle size instrument.

The kaolin clay feedstock can be processed in any known and conventional mineral processing scheme for subsequent coupling with the silanes disclosed herein. In one instance, the kaolin clay feed can be produced from the known waterwashing process to form a fine particle size clay of essentially neutral pH. In waterwashing, the crude clay is made into a slurry using chemical dispersants and then fractionated or classified to remove unwanted material and to divide the clay into the desired particle size. The fractionated clay slurry is then subjected to any number of chemical purification/grinding techniques to remove impurities and increase the clay brightness to the desired brightness level. After filtration, the beneficiated clay filter cake is redispersed at a neutral pH for subsequent product use. Since this waterwashing technique is well recognized in the art, a further description thereof is not needed for understanding of the invention.

Alternatively, the kaolin clay to be combined with the silane can be an airfloat type. Airfloat clay is obtained by crushing crude clay, drying it and air classifying it to remove unwanted materials and to achieve a particular particle size.

The kaolin clay starting material for silane treatment can also be a delaminated clay which combines the processing sequences used in waterwashing with an additional media based wet grinding step to produce clays with a platelet-like morphology, i.e., a higher aspect ratio than just waterwashed clays. The use of such delaminated clays is of particular interest when treated clay fillers targeted to improve rubber compression set properties and/or various barrier properties (such as air permeability resistance) are desired. It should be understood that the kaolin clay starting material for silane treatment can be processed according to the techniques described above or any other known techniques in the clay industry. Likewise, although specific clay compositions are disclosed herein below, any known kaolin clays are deemed usable for the inventive silane treatment, treatment process and elastomeric applications.

When treating slurries of waterwashed kaolin clays, addition of the functional silanes is best accomplished by using an aqueous silane emulsion. When silane treating an airfloat clay, it is preferred to use a dry solids/liquid mixing device such as a ribbon blender, pin mixer, Littleford blender, etc., to mix the dry clay with the silane emulsion. The functional silanes are added to the dry clay solids in emulsified form under intimate mixing conditions. The silane-treated clay product can then be dried to remove residual moisture and pulverized.

Typically, waterwashed kaolin clay products have a fine particle size and high brightness. Airfloat clay products have a fine particle size but are a low brightness. Delaminated clay products have a coarser particle size, higher aspect ratio and slightly lower brightness than non-delaminated waterwashed clay products.

The silanes are high speed dispersed into water in the presence of surfactants to form a silane emulsion. In order to efficiently and uniformly disperse the silanes into the water, the fluid mixture containing silanes, surfactants and water should be agitated vigorously. A silane dispersion fluid wherein silanes have been pre-dispersed in surfactant-containing water should be prepared prior to mixing the silanes with the kaolin clay. The concentration of the silanes in the silane dispersion fluid should be 25–60% by weight. Additionally, the amount of surfactant used should be 0.5–10 parts by weight, more preferably 2.0–5.0 parts by weight with respect to 100 parts by weight of the silane. It is preferable that the surfactants employed have HLB (hydrophilic/lipophilic balance) values of 8–18 and various non-ionic surfactants are especially preferable as the surfactants. The above-mentioned silane dispersion fluid is pH-adjusted depending upon the type of silane, prior to mixing with the kaolin clay.

If the pH of a silane dispersion fluid wherein sulfur atom-containing mercaptosilanes, thiocyanatosilanes or disilyl tetrasulfanes are dispersed in water with a surfactant is adjusted to be alkaline, for example in the pH range of 7.5–10, then the sulfur functional silane emulsion can be stabilized. That is, if the pH of the silane dispersion fluid is alkaline in this way, then the sulfur functional silane can be prevented from being lost by means of silanol self condensation into silicone oligomers or polymers before reacting with the surface hydroxyls of the kaolin clay.

On the other hand, if the pH of a silane dispersion fluid wherein vinyl functional silanes are dispersed in water in the presence of surfactants is adjusted to be acidic, for example in the pH range of 3.0–5.0, or to be alkaline in the pH range of 7.5–10.0, then the silane emulsion can be stabilized. If the pH of the silane dispersion fluid is adjusted in this way, then the vinyl functional silane can be prevented from being lost by means of silanol self condensation before ever reacting with the kaolin clay. The pH of the silane dispersion fluid can be adjusted by adding alkaline or acidic substances such as sodium hydroxide, potassium hydroxide or acetic acid.

The silane dispersion fluid is mixed with a kaolin clay powder, or more preferably, with a clay slurry wherein kaolin clay has been suspended in water. When the silane dispersion fluid, and the kaolin clay slurry are combined, two miscible fluids are being mixed, thus making it especially easy to uniformly mix together the silane and the kaolin clay. As a result, the required mixing time becomes shorter and the silanes are distributed uniformly on to the surface of the kaolin clay particles. The solids concentration of kaolin clay in the slurry is typically 40–70% by weight but more preferably 50–60% by weight as dispersed clay filter cake slurries are conveniently used.

In treating waterwashed kaolin clays, the addition of a silane emulsion to clay slurry normally occurs at the dispersed clay filter cake stage. The clay slurry at this point in the waterwashed beneficiation process is typically 50–60% solids and has a pH value falling into the range of 6.0–8.0. Addition of the silane emulsion can be handled in one of several ways so long as it is introduced to the dispersed clay slurry under good mixing conditions (e.g., via a Cowles mixer or in-line mixer injection). After mixing the treated clay slurry a sufficient time to achieve good treatment uniformity, the product is then spray-dried using typical commercial drying conditions.

In the case of silane treating an airfloat clay, this is best accomplished through the use of a dry solids/liquid mixing device (such as a ribbon blender, pin mixer, Littleford blender, etc.). The functional silanes are again best applied in emulsified form. After intimate mixing of the clay and silane emulsion, the product is then dried to remove residual moisture and pulverized.

The amount of vinyl functional silane in the treatment mixture should preferably be 0.2–5 parts by weight with respect to 100 parts by weight of dry kaolin clay. If the treatment amount is less than 0.2 parts by weight, then the surface treatment effect of the silane on reinforcement is not sufficient, and an amount of greater than 5 parts by weight is excessive and uneconomical. More preferably, the silane amount varies between about 1.0 and 2.0 parts by weight for vinyl functional silanes. In the case of sulfur functional silanes, the preferred treatment amounts range from 0.7 to 5.0 parts by weight, while 1.0–2.0 parts by weight are most preferred. When vinyl functional or sulfur functional treated clays having silane treatment levels of 1.0–2.0% by weight of dry clay are prepared with silane emulsions in accordance with the teachings of this invention, high performance as well as cost effective rubber compositions are obtained.

After the kaolin clay slurry and silane dispersion fluid have been mixed, heat drying this mixture via conventional spray-drying or flash-drying causes a chemical reaction between the hydrolysed silane and the surface hydroxyls of the kaolin clay, thereby resulting in a silane surface-treated clay by means of a functional silane. Additionally, heat drying provides the silane treated clay as a dry powder. For example, a conventional spray-dryer adjusted so as to have an inlet air temperature of 400°–650° C. and an outlet temperature of about 120° C. can be used for heat-drying silane-treated clay slurries. While 10 ppm–5000 ppm of surfactants such as non-ionic surfactants normally remain in the silane-treated clay, the amount is sufficiently small as to not have any adverse effects on the physical properties of the clay filled rubber compositions.

While the silane-treated clay of the present invention can be applied to many different uses, it is suited for use as a filler for synthetic resins such as polyethylene or polypropylene, or as a reinforcing filler or extender for natural or synthetic rubbers. The silane-treated clay of the present invention is especially suited to use as a reinforcing filler for natural and synthetic rubbers because the pendant functional group (a vinyl or sulfur containing group) on the silane-treated clay chemically reacts with these rubber polymers during the curing process to yield reinforcement via cross-linking between the clay and the polymer. As examples of synthetic rubber, isoprene rubber (IR), nitrile butadiene rubber (NBR), ethylene-propylene rubber (EPDM), styrene butadiene rubber (SBR) and polybutadiene rubber (BR) can be given. By adding 10–150 parts by weight of silane-treated clay with respect to 100 parts by weight of natural or synthetic rubber, it is possible to obtain a compound having exceptional mechanical strength. Rubber compositions with this filler loading have excellent physical properties, as well as making rubber products more economical. The silane-treated clay of the present invention can provide compositions of white color or enable the making of color pigmented rubber products.

A silane-treated clay to be added to rubber for the purpose of enhancing modulus, tensile strength or tear properties should preferably be a fine powder having a clay particle size of at least 90% less than 2 $\mu$m as determined by x-ray Sedigraph, and a BET surface area of 19–28 $m^2/g$. If the particle size is small and the surface area is large for a silane-treated clay in this way, then it will have good reinforcing strength with respect to rubber. However, in the case of improving rubber compression set properties, a silane treated clay filler comprised of a delaminated type kaolin clay derived from Cretaceous clay crudes having a clay particle size of about 70% less than 2 $\mu$m as determined by x-ray Sedigraph, and a BET surface area of 11–15 $m^2/g$ is sometimes preferred as the clay starting material. Such delaminated clays are also known to provide good barrier properties to various rubber goods.

While the above-mentioned rubber composition contains a silane-treated clay and natural or synthetic rubber as necessary components, vulcanizing agents, cross-linking agents, vulcanization accelerators, age resistors, antioxidants, UV absorbents, plasticizers, lubricants, flame retardants, or other fillers such as silica or carbon black can also be added if necessary. Additionally, while there are no restrictions to the method of processing the rubber compositions of the present invention, the desired product can be obtained through calendaring, extrusion molding, compression molding, injection molding or the like.

EXAMPLES

Herein below, the present invention will be explained in detail with the use of examples. In the examples, the terms "parts" and "%" always indicate parts by weight and % by weight.

Examples 1–3

Silane-treated, waterwashed clays wherein kaolin clay was surface-treated by means of mercaptosilane and thiocyanatosilane were produced in the following manner. Kaolin clay recovered from the Tertiary clay layer of Eastern Georgia (hereinafter referred to as Clay A) was made into a slurry by adding water and a chemical dispersant. This slurry was then beneficiated to remove coarse clay and low brightness impurities, filtered and redispersed to provide a dispersed filter cake slurry (hereinafter referred to as Slurry A) having a 50% solids concentration of Clay A. Slurry A was then dried and chemically analyzed, whereupon Clay A was found to contain 0.71% $TiO_2$, 1.14% $Fe_2O_3$, 38.89% $Al_2O_3$ 45.34% $SiO_2$, 0.22% $Na_2O$, 0.09% $K_2O$, and 0.01% CaO; with an ignition loss of 13.68%. An example of Clay A is J. M. Huber Corporation's Polyfil™ HG-90, a waterwashed ultrafine particle size, high brightness hydrous kaolin clay.

A dispersion fluid (hereinafter referred to as Dispersion Fluid M) wherein 3-mercaptopropyl trimethoxysilane $(CH_3O)_3$—Si—$C_3H_6SH$ (hereinafter referred to as Silane M) was emulsified in water and was prepared in the following manner. Dispersion Fluid M was obtained by emulsifying Silane M into water by mixing Silane M into a 1.0% aqueous solution of PEG-20 sorbitol monolaurate (a sorbitan-monolaurate POE ether with 20 moles of added ethylene oxide) which is a non-ionic surfactant having an HLB value of 16.7, then adjusting the pH to 8.0 by adding an alkali such as sodium hydroxide. The concentration of Silane M in Dispersion Fluid M was 50%.

A dispersion fluid (hereinafter referred to as Dispersion Fluid T) wherein 3-thiocyanatopropyl triethoxysilane $(C_2H_5O)_3$—Si—$C_3H_6SCN$ (hereinafter referred to as Silane T) was emulsified in water and was prepared in the following manner. Dispersion Fluid T was obtained by emulsifying Silane T into water by mixing Silane T into a 1% aqueous solution of PEG-20 sorbitol monolaurate, then adjusting the pH to 8.0 by adding an alkali. The concentration of Silane T in dispersion Fluid T was 50%.

Treated clay slurries were obtained by mixing Silane Dispersion Fluid M or Silane Dispersion Fluid T with Slurry A by means of an agitator. In both cases, the liquid Silane Dispersion Fluids M and T were able to be uniformly mixed into Slurry A in a short time. Three different treated slurries were prepared by mixing either Silane Dispersion Fluid M or Silane Dispersion Fluid T into Slurry A such that the amount of Silane M or Silane T would be 0.7–1.3 parts with respect to 100 parts by weight of active Clay A.

Then, each of the treated clay slurries were supplied to a spray dryer having an air inlet temperature between about 400°–650° C. for heating, whereby Silane M or Silane T was chemically reacted with Clay A. After spray drying, a silane-treated clay product wherein 3-mercaptopropyl trimethoxysilane was chemically bonded to the surface of Clay A (hereinafter referred to as Clay AM) and silane-treated clays wherein 3-thiocyanatopropyl triethoxysilane was chemically bonded to the surface of Clay A (hereinafter referred to as Clay AT) were obtained in fine powder form. Of the resulting silane-treated clays, the silane-treated clay formed by mixing 1.1 parts of Silane M with respect to 100 parts of active Clay A will be referred to as Example 1, the silane-treated clay formed by mixing 0.7 parts of Silane T with respect to 100 parts of active Clay A will be referred to as Example 2, and the silane-treated clay formed by mixing 1.3 parts of Silane T with respect to 100 parts of active Clay A will be referred to as Example 3.

The results of physical property measurements, such as average particle size and particle size distribution, of Clay AM according to Example 1 are shown in Table 1. The silane-treated Clay AM according to Example 1 was a fine white powder with a Sedigraph Average Stokes Equivalent particle size of 0.26 μm, and the concentration of particles of less than 2 μm was found to be 96.1%. The amount of residual non-ionic surfactant remaining in the silane-treated Clay AM of Example 1 was 220 ppm.

TABLE 1

| Silane-treated Clay | | EXAMPLE 1 |
|---|---|---|
| Silane-treated Clay | Name | Silane-treated Clay AM |
| | Type of Silane | Silane M |
| | Amount of Silane | 1.1 parts by weight |
| Average-Particle Size (Sedigraph) | μm | 0.26 |
| Particle Size Distribution (Sedigraph): | | |
| more than 10 μm | % | 1.00 |
| more than 5 μm | % | 1.30 |
| less than 2 μm | % | 96.1 |
| less than 1 μm | % | 93.8 |
| less than 0.5 μm | % | 82.8 |
| less than 0.2 μm | % | 36.4 |
| Malvern Particle Size (median value) | μm | 0.71 |
| BET Surface Area | m²/g | 21.2 |

TABLE 1-continued

| | | EXAMPLE 1 |
|---|---|---|
| Aspect Ratio | | 4.7 |
| Brightness (TAPPI Standard) | % | 91.2 |
| Oil Absorption (per 100 g of clay) | g | 37.5 |
| Specific Gravity | | 2.60 |

Examples 4–6 Comparative Example 1

These Examples investigate the performance of the silane-treated waterwashed clays of Examples 1–3 as a reinforcing filler in a rubber composition.

The silane-treated Clay AM of Example 1 and the silane-treated Clays AT of Examples 2 and 3 were mixed into an isoprene rubber (IR), then the processability of the resulting IR rubber compositions and the reinforcing effects of the silane-treated Clays AM and AT with respect to IR rubber were tested by the following methods. A processing aid, an anti-oxidant zinc oxide, sulfur, stearic acid, a vulcanizing agent, benzoic acid, and 75 parts of silane-treated Clay AM, silane-treated Clay AT or non-surface-treated Clay A were mixed into 100 parts by weight of unvulcanized IR rubber. The mixture was masticated by means of an internal mixer and finalized with an open faced two roll mill to yield a test material suitable for measuring the processability of the rubber. The mixture was subsequently compression molded and vulcanized to obtain test pieces suitable for measuring the physical properties of the rubber compound. The compositional makeup of the above rubber compound is shown in Table 2. Additionally, the types of silane-treated Clay AM and silane-treated clays AT are shown in Table 3 along with the measurement results for their rubber processability and physical properties. The composition formed from IR rubber and the silane-treated Clay AM of Example 1 will be referred to as Example 4, and the compositions formed from IR rubber and the silane-treated Clays AT of Examples 2 and 3 will respectively be referred to as Examples 5 and 6. Comparative Example 1 is a composition formed from IR rubber and a spray-dried Clay A which has not been surface-treated.

TABLE 2

| MATERIAL | TYPE | AMOUNT (parts by weight) |
|---|---|---|
| Unvulcanized IR Rubber | | 100.00 |
| Filler | | 75.00 |
| Processing Aid | Polyethylene Type | 2.50 |
| Anti-oxidant | | 2.0 |
| Stearic Acid | | 2.0 |
| Zinc Oxide | (French process) | 5.0 |
| Sulfur | | 1.60 |
| Vulcanizing Agent | N-tert-butyl-2-benzothiazyl sulfenamide | 1.60 |
| Vulcanizing Agent | zinc Di-n-butyl-dithiocarbamate | 0.50 |
| Vulcanizing Agent | Diphenylguanidine | 0.50 |
| Benzoic Acid | | 1.00 |
| TOTAL | | 191.70 |

TABLE 3

| | | EX. 4 | EX. 5 | EX. 6 | COMP. EX. 1 |
|---|---|---|---|---|---|
| Filler | Name | Silane-treated Clay AM | Silane-treated Clay AT | Silane-treated Clay AT | Clay A |
| | Type of Silane | Silane M | Silane T | Silane T | — |
| | Amount of Silane (parts by weight) | 1.1 | 0.7 | 1.3 | — |
| Rheometer (T-90%) | min. | 5:30 | 5:57 | 5:51 | 5:27 |
| Durometer (Shore A) | pts. | 65 | 65 | 65 | 61 |
| Tensile Strength | Psi | 3830 | 3790 | 3460 | 3350 |
| Elongation | % | 490 | 520 | 480 | 600 |
| Modulus @ 100% Elongation | Psi | 590 | 500 | 540 | 280 |
| @ 200% Elongation | Psi | 1270 | 1030 | 1160 | 390 |
| @ 300% Elongation | Psi | 1720 | 1610 | 1780 | 470 |
| Tear Die "C" | Psi | 337 | 326 | 348 | 186 |

According to Table 3, the rubber compositions of Examples 4–6 have approximately the same processability as that of Comparative Example 1 which uses Clay A which has not been surface-treated. In other words, neither of the silane-treated Clays AM or AT reduce the processability of the rubber. Additionally, the compositions of Examples 4–6 which used silane-treated Clays AM and AT exhibit more tensile strength, a higher modulus at 100%, 200% and 300%, and improved tear strength thus indicating that they have a remarkable reinforcing effect with respect to rubber.

Example 7

A silane-treated clay (hereinafter referred to as Clay AV) was produced by surface-treating Clay A with vinyltriethoxysilane $(C_2H_5O)_3$—Si—CH=CH$_2$ (hereinafter referred to as Silane V) in the following manner. A silane dispersion fluid, wherein Silane V was emulsified and dispersed in water at a concentration of 40%, was obtained at room temperature by adding Silane V to a 1.0% aqueous solution of PEG-12 dioleate non-ionic surfactant which has an HLB value of 10.0 and vigorously agitating. Acetic acid was also added to the silane dispersion fluid to adjust the pH to 4.0 to stabilize the Silane Dispersion Fluid V. Silane-treated Clay AV (Example 7), wherein Clay A is surface-treated with vinyltriethoxysilane, was able to be produced in the same manner as Example 1, excepting that Silane Dispersion Fluid V was used instead of Silane Dispersion Fluid M. Silane Dispersion Fluid V and Slurry A were able to be thoroughly mixed together in a short time.

Silane-treated Clay AV of Example 7, surface-treated with 1.1% by weight of vinyltriethoxysilane was added to NBR rubber to test the reinforcing effect of silane-treated Clay AV with respect to NBR rubber. Table 4 shows the compositional makeup and the physical property testing results for a rubber composition obtained by mixing an anti-oxidant, zinc oxide, zinc stearate, a plasticizer, an organic peroxide, and 100 parts of silane-treated Clay AV or calcined clay to 100 parts of unvulcanized NBR rubber, masticating, and then cross-linking with organic peroxides.

The only difference between the composition of Example 7 and the composition of Comparative Example 2 is the type of clay filler. According to Table 4, the NBR rubber composition of Example 7 containing silane-treated Clay AV, when compared with the NBR rubber composition of Comparative Example 2 containing a standard calcined clay (namely, Polyfil 80 of J. M. Huber Corporation), has about the same elongation as Comparative Example 2, but it is harder, has a higher tensile strength and modulus at 100%, and has better compression set per smaller permanent deformations. That is, the silane-treated Clay AV surface-treated with vinyltriethoxysilane has a much greater reinforcing effect with respect to NBR rubber than does untreated calcined clay. In this case, calcined clay refers to a x-ray amorphous, anhydrous aluminosilicate product produced by heating a water-washed hydrous kaolin clay at temperatures of 550°–1100° C. (which thermally dehydroxylates the clay mineral).

TABLE 4

| | | EX. 7 | COMP. EX. 2 |
|---|---|---|---|
| Filler | Name | Silane-treated Clay AV | Calcined Clay |
| | Type of Silane | Silane V | — |
| | Amount of Silane (parts by wt.) | 1.1 | — |
| Unvulcanized NBR Rubber | | 100 parts | 100 parts |
| Quinoline-type Aoe Resistor | | 2 parts | 2 parts |
| Zinc Oxide | | 5 parts | 5 parts |
| Zinc Stearate | | 1 part | 1 part |
| Filler | | 100 parts | 100 parts |
| Di-(2-ethylhaxyl) sebacate | | 10 parts | 10 parts |
| 1,3-bis(tertiary butyloxyisopropyl) benzine | | 6 parts | 6 parts |
| Hardness (Shore A, pts.) | | 74 | 69 |
| Tensile Strength (kgf/cm$^3$) | | 166 | 61 |
| Elongation (%) | | 380 | 422 |
| Modulus @ 100% Elongation (kgf/cm$^3$) | | 67 | 20 |
| Compression Set-% Permanent Deformation (100° C., 22 H) | | 12 | 23 |

*Vulcanization Conditions: 160° C. for 20 minutes
*"parts" indicate parts by weight Examples 8–11

These Examples involve the preparation and characterization of a silane-treated, fine particle size airfloat kaolin clay to investigate its performance in a rubber composition.

Three different silane-treated clays were prepared, wherein kaolin clay recovered from sedimentary clay in South Carolina was processed into a fine particle size airfloat clay and this airfloat clay (hereinafter referred to as Clay B) was then subsequently mixed with the appropriate silane dispersion fluid to effect silane treatment after drying and pulverization. Clay B was surface treated with 3-mercaptopropyl trimethoxysilane (Silane M) to form a silane-treated clay (hereinafter referred to as Clay BM), Clay B was also surface treated with 3-thiocyanatopropyl triethoxysilane (Silane T) to form a silane-treated clay (hereinafter referred to as Clay BT) and finally Clay B was surface treated with bis(3-triethoxysilylpropyl)tetrasulfane (hereinafter referred to as Silane B) to form a silane-treated clay (hereinafter referred to as silane-treated Clay BB). These silane-treated clays were produced in the following manner.

The dry airfloat Clay B was intimately mixed with the silane which was added as an emulsion using a dry solids/liquid mixing device. After mixing, the silane treated clay is then dried to remove residual moisture and pulverized.

Silane-treated Clay BM was produced by surface-treating Clay B with 3-mercaptopropyl trimethoxysilane wherein Clay B was mixed with the Silane Dispersion Fluid M of Example 1. Silane-treated Clay BT was produced by surface-treating Clay B with 3-thiocyanatopropyl triethoxysilane wherein Clay B was mixed with the Silane Dispersion Fluid T of Example 2.

The silane-treated Clay BB was produced in the following manner. Silane Dispersion Fluid B was obtained by emulsifying Silane B into water by vigorously mixing bis(3-triethoxysilylpropyl) tetrasulfane $(C_2H_5O)_3$—Si—$(CH_2)_3$—SSSS—$(CH_2)_3$—Si—$(OC_2H_5)_3$ (hereinafter referred to as Silane B) into a 1.0% aqueous solution of 20-EO ethoxylated nonylphenol (a nonylphenol-polyoxyethylene ether with 20 moles of added ethylene oxide), which is a non-ionic surfactant having an HLB value of 16.7, to form a silane dispersion fluid having a 40% concentration of Silane B, then adjusting the pH to 8.5 by adding an alkali (hereinafter referred to as Dispersion Fluid B).

Silane-treated Clay BB was produced by surface-treating Clay B with bis(3-triethoxysilylpropyl) tetrasulfane (Silane B) wherein Clay B was intimately mixed with the Silane Dispersion Fluid B.

A silane-treated Clay BM obtained by mixing 1.00 part of Silane M (added as Silane Dispersion Fluid M) with 100 parts of active Clay B will be referred to as Example 8, a silane-treated Clay BT obtained by mixing 1.00 part of Silane T (added as Silane Dispersion Fluid T) with 100 parts of active Clay B will be referred to as Example 9, and silane-treated Clays BB obtained by mixing 0.70 and 1.00 parts of Silane B (added as Silane Dispersion Fluid B) with 100 parts of active Clay B will be referred to as Examples 10 and 11 respectively.

The results of physical property measurements, such as the average particle size of the silane-treated Clay BB according to Example 11 are shown in Table 5. The silane-treated Clay BB of Example 11 is a fine powder having an Average Stokes Equivalent particle size of 0.30 $\mu$m by x-ray Sedigraph, wherein 89.3% of the clay particles have particle sizes of less than 2 $\mu$m.

TABLE 5

|  |  | EXAMPLE 11 |
| --- | --- | --- |
| Silane-treated Clay | Name | Clay BB |
|  | Type of Silane | Silane B |
|  | Amount of Silane | 1.0 parts by weight |
| Average Particle Size (sedigraph) | $\mu$m | 0.30 |
| Particle Size Distribution (sedigraph): |  |  |
| more than 10 $\mu$m | % | 3.0 |
| More than 5 ∞m | % | 4.30 |
| Less than 2 $\mu$m | % | 89.3 |
| Less than 1 $\mu$m | % | 83.1 |
| Less than 0.5 $\mu$m | % | 70.0 |
| Less than 0.2 $\mu$m | % | 34.8 |
| Malvern Particle Size (median value) | $\mu$m | 2.44 |
| BET Surface Area | $m^2/g$ | 25.1 |
| Aspect Ratio |  | 9.5 |
| Specific Gravity |  | 2.60 |

Examples 12–15

The silane-treated Clays BM, BT and BB of Examples 8–11 were added to IR rubber in the proportions shown in Table 2, and their reinforcing effects with respect to IR rubber were examined in the same manner as with Examples 4–6. The various silane-treated Clays BM, BT and BB are shown in Table 6 along with their test results of rubber processability and physical reinforcement properties. According to Table 6, the rubber compositions of Examples 12–15 have approximately the same processability as Comparative Example 3 which uses Clay B that has not been surface-treated. Additionally, the compositions of Examples 12–15 which use silane-treated Clays BM, BT and BB were found to have higher tensile strengths, better tear strengths and higher moduli at 100%, 200% and 300% elongation than Comparative Example 3, thus showing they have exceptional rubber reinforcing effects. That is, the silane-treated Clays BM, BT and BB produced from a fine particle size airfloat clay (Clay B) have excellent reinforcing effects.

TABLE 6

|  |  | EX. 12 | EX. 13 | EX. 14 | EX. 15 | COMP. EX. 3 |
| --- | --- | --- | --- | --- | --- | --- |
| Filler | Name | Silane-treated Clay BM | Silane-treated Clay BT | Silane-treated Clay BB | Silane treated Clay BB | Clay B |
|  | Type of Silane | Silane M | Silane T | Silane B | Silane B | — |
|  | Amount of Silane (parts by weight) | 1.00 | 1.00 | 0.70 | 1.00 | — |
| Rheometer (T = 90%) min. |  | 5.05 | 5.04 | 4.47 | 5.11 | 4.59 |
| Durometer (Shore A) pts. |  | 62 | 62 | 62 | 69 | 59 |
| Tensile Strength (psi) |  | 3640 | 3710 | 3720 | 3790 | 3430 |
| Elongation % |  | 430 | 420 | 450 | 460 | 500 |
| Modulus @ 100% |  | 690 | 760 | 540 | 580 | 320 |

TABLE 6-continued

|  | EX. 12 | EX. 13 | EX. 14 | EX. 15 | COMP. EX. 3 |
|---|---|---|---|---|---|
| Elongation (psi) |  |  |  |  |  |
| Modulus @ 200% | 1280 | 1390 | 950 | 1033 | 500 |
| Elongation (psi) |  |  |  |  |  |
| Modulus @ 300% | 2020 | 2170 | 1590 | 1730 | 840 |
| Elongation (psi) |  |  |  |  |  |
| Tear Die "C" (pli) | 355 | 366 | 311 | 318 | 209 |

Example 16

A silane-treated clay (hereinafter referred to as Clay CV), wherein kaolin clay recovered from the Cretaceous clay layer in middle Georgia was waterwash processed and wet ground to form a delaminated clay product (hereinafter referred to as Clay C) for subsequent surface treatment with vinyltriethoxysilane. An Example of Clay C is Polyfil DL made by J. M. Huber Corporation of Macon, Ga.

The kaolin clay recovered from the Cretaceous clay layer in middle Georgia was made into a slurry by adding water and chemical dispersants. This slurry was waterwash processed and wet ground to form a delaminated clay, then filtered and redispersed at a neutral pH to obtain Slurry C having a 55% solids concentration. The pH of Slurry C was found to be 6.8 at room temperature. Slurry C was then spray-dried and chemically analyzed, whereupon Clay C was found to contain 0.87% $TiO_2$, 0.43% $Fe_2O_3$, 39.41% $Al_2O_3$, 45.27% $SiO_2$, 0.28% $Na_2O$, 0.11% $K_2O$, and 0.02% CaO; with an ignition loss of 13.54%. A silane-treated clay (hereinafter referred to as Clay CV) was obtained by surface-treating Clay C with vinyltriethoxysilane in the same manner as described in Example 7, excepting that Slurry C was used instead of Slurry A. The Average Stokes Equivalent particle size, particle size distribution, specific gravity, BET surface area, aspect ratio and oil absorption of silane-treated Clay CV are shown in Table 7. Silane-treated Clay CV had an Average Stokes Equivalent particle size by Sedigraph of 0.78 μm.

TABLE 7

|  |  | Example 16 |
|---|---|---|
| Silane-treated Clay | Name | Silane-treated Clay CV |
|  | Type of Silane | Silane V |
|  | Amount of Silane | 1.1 parts by weight |
| Average Particle Size (sedigraph) | μm | 0.78 |
| Particle Size Distribution (sedigraph): |  |  |
| more than 10 μm | % | 2.40 |
| more than 5 μm | % | 9.20 |
| less than 2 μm | % | 70.7 |
| less than 1 μm | % | 55.6 |
| less than 0.5 μm | % | 36.7 |
| less than 0.2 μm | % | — |
| Malvern Particle Size (median value) | μm | 5.55 |
| BET Surface Area | m$^2$/g | 33.0 |
| Aspect Ratio |  | 13 |
| Specific Gravity |  | 2.60 |

A rubber composition was obtained by adding silane-treated Clay CV to NBR rubber in the same manner as disclosed in Example 7, excepting that silane-treated Clay CV was used instead of the silane-treated Clay AV. The permanent deformation by compression of a molded rubber article obtained by vulcanizing this rubber composition at 160° C. for 20 minutes was smaller as compared with the compression set value shown in Table 4 for silane-treated Clay AV. These data point to the utility of delaminated clays in improving the compression set properties of rubber.

Examples 17–18

In this experiment hereafter referred to as Example 17, a Silane-treated Clay AT having a 1.00% by weight treatment level of Silane T was prepared by treating the dispersed filter cake slurry of Clay A (i.e., Slurry A) with Silane Dispersion Fluid T under good agitation and then spray-drying the mixture in accordance with the previous teachings of Examples 2 and 3. Agitation of this treated slurry was conducted over a period of about 2 hours prior to spray-drying the product. The dry product, silane-treated Clay AT of 1.0% treatment, was then analyzed by carbon combustion analysis to quantify the amount of silane treatment present on the clay. A carbon analysis conducted in triplicate indicated an average silane treatment level of 0.999% for the silane-treated Clay AT of Example 17, based on individual readings of 0.997%, 0.999% and 1.002%. These values agree quite well with the theoretical treatment level of 1.00% per the proportions of Clay A and Silane T used.

In a subsequent treatment experiment identified as Example 18, Slurry A was again treated with a 1.0% by weight addition of Silane T; however, the thiocyanatosilane was added neat to Slurry A under good agitation rather than as the Silane Dispersion Fluid T. After mixing the treated slurry continuously overnight (about 18 hours), Silane T visually appeared to have fully dispersed into Slurry A whereupon the treated slurry was spray-dried. The dry product was then analyzed by carbon combustion analysis for the amount of silane treatment present. Unlike the silane-treated Clay AT of Example 17, carbon analysis now indicated an average silane treatment level of only 0.838% (based on individual readings of 0.900%, 0.775% and 0.839%) rather than the expected value of 1.00%. These treatment level data clearly demonstrate the importance of adding Silane T as an aqueous emulsion. In the absence of any surfactant, Silane T apparently never completely dispersed into Slurry A and/or never completely hydrolyzed even after 18 hours of mixing such that some silane was lost (presumably volatilized away) during spray-drying. Furthermore, the applied surface treatment is not very uniform as reflected by the significant variability in the individual treatment level values. In contrast, the silane-treated Clay AT of Example 17 yielded excellent treatment level results after mixing the clay and emulsified silane for only 2 hours.

Examples 19–31

This experiment investigates the performance of the silane-treated Clay AT of Example 17 as a reinforcing filler and more particularly as an extender for soft carbon black in a rubber compound. The performance of silane-treated Clay AT of Example 17 is also directly compared to that of a conventional, sulfur functional silane treated clay (namely Nucap™ 290 of J. M. Huber Corporation). These treated clay fillers were evaluated head-to-head in a vulcanized IR rubber compound in accordance with the composition previously described in Table 2. The clay filler loading in this IR rubber compound is 75.0 phr. The relative performance properties of the silane-treated Clay AT and Nucap™ 290 can be seen in Tables 8 and 9, respectively. In addition, these rubber performance tables show the relative capabilities of each treated clay to extend a soft carbon black filler like N-660. The levels of N-660 carbon black replacement examined ranged from 10% replacement up to 55% replacement. In carrying out these extension studies, the total filler loading was maintained at 75.0 phr so that replacement of the N-660 with a treated clay was done on a weight basis. The test results of rubber processability and physical reinforcement properties are presented in Tables 8 and 10 9. The results for a control compound containing just N-660 carbon black (at 75.0 phr) are also presented.

the higher tensile strength and moduli properties of Example 19. This superior performance is also reflected in the relative amounts of N-660 carbon black that can be replaced by these treated clays while maintaining a very high modulus value. For instance, when comparing the performance properties of Examples 20–24 with those of Examples 27–31, one will note that about 50% of the N-660 carbon black can be replaced with the 1% silane-treated Clay AT while still providing a high 300% modulus level of approximately 2300 psi whereas only about 30% replacement of N-660 is realized at that same modulus when using Nucap™ 290. The 1% silane-treated Clay AT also provides greater tensile and better tear properties as compared to the N-660 carbon black control (compare Examples 19 and 26). These examples all illustrate the high performance characteristics associated with the silane-treated clays of this invention.

Examples 32–36

These Examples compare the performance of Clay AT of Example 17, a fine particle size clay having a 1% treatment

TABLE 8

| Experiment ID | Ex. 19 | Ex. 20 | Ex. 21 | Ex. 22 | Ex. 23 | Ex. 24 |
|---|---|---|---|---|---|---|
| Filler System | Silane-treated Clay AT-Ex. 17 | N-660 & Clay AT-Ex. 17 | N-660 & Clay AT-Ex. 17 | N-660 & Clay AT-Ex. 17 | N-660 & Clay AT-Ex. 17 | N-660 & Clay AT-Ex. 17 |
| Carbon Black/Clay % Ratio | 0/100 | 85/15 | 75/25 | 65/35 | 55/45 | 45/55 |
| Rheometer (T = 90%) (min.) | 5:49 | 3:47 | 4:09 | 4:20 | 4:15 | 4:37 |
| Durometer (Shore A) (pts.) | 65 | 74 | 74 | 74 | 73 | 73 |
| Tensile (psi.) | 3450 | 2780 | 2710 | 2940 | 2820 | 3010 |
| Elongation, % | 440 | 330 | 350 | 390 | 380 | 400 |
| Modulus @ 100% (psi) | 680 | 840 | 810 | 820 | 820 | 780 |
| Modulus @ 200% (psi) | 1370 | 1870 | 1740 | 1690 | 1650 | 1600 |
| Modulus @ 300% (psi) | 2060 | 2600 | 2450 | 2390 | 2310 | 2300 |
| Tear Die "C" (pli.) | 388 | 376 | 371 | 369 | 367 | 367 |

TABLE 9

| Experiment ID | Ex. 25 | Ex. 26 | Ex. 27 | Ex. 28 | Ex. 29 | Ex. 30 | Ex. 31 |
|---|---|---|---|---|---|---|---|
| Filler System | Nucap ™ 290 Clay | N-660 CB | N-660 & Nucap ™ 290 | N-660 & Nucap ™ 290 | N-660 & Nucap ™ 290 | N-660 & Nucap ™ 290 | N-660 & Nucap ™ 290 |
| Carbon Black/Clay % Ratio | 0/100 | 100/0 | 90/10 | 85/15 | 80/20 | 75/25 | 70/30 |
| Rheometer (T = 90%) (min.) | 5:50 | 3:58 | 3:55 | 4:02 | 4:04 | 4:12 | 4:07 |
| Durometer (Shore A) (pts.) | 65 | 75 | 74 | 74 | 74 | 74 | 73 |
| Tenisle (psi.) | 3250 | 2390 | 2800 | 2680 | 2720 | 2660 | 2870 |
| Elongation % | 460 | 240 | 340 | 330 | 350 | 380 | 390 |
| Modulus @ 100% (psi) | 570 | 890 | 810 | 820 | 780 | 750 | 750 |
| Modulus @ 200% (psi) | 1130 | 2040 | 1840 | 1800 | 1710 | 1660 | 1610 |
| Modulus @ 300% (psi) | 1700 | — | 2570 | 2500 | 2430 | 2380 | 2330 |
| Tear Die "C" (pli.) | 383 | 358 | 379 | 376 | 373 | 371 | 367 |

In comparing the performance properties of Examples 19 and 25, the above test data show the superior reinforcement provided by the silane-treated Clay AT of 1.0% treatment relative to a conventional sulfur functional treated clay like Nucap™ 290. Superior filler reinforcement is indicated by level of silane T, versus four different silica samples as reinforcing fillers in a sulfur-cured nitrile rubber formulation. Table 10 describes the nitrile rubber compositions of Examples 32–36 and shows their relative performance properties.

The reinforcing properties (tensile and modulus at 100% elongation) of Example 36 (Clay AT) are considerably higher than those of the two natural silica fillers, Examples 34 and 35, even though these comparative evaluations were made at equal filler loadings (@100 phr) and the latter silica product was silane treated. Clay AT and Example 32 (a precipitated silica used at a loading of 60 phr) provided virtually equivalent tensile strengths though Clay AT provided approximately double the modulus at 100% elongation. Compared to the silane treated precipitated silica (Example 33), Clay AT gave the nitrile rubber composition a slightly higher modulus value and significantly better compression set though not quite as high a tensile strength. In particular, the Clay AT provided the highest modulus of all the Examples and gave the lowest (best) compression set values. This comparison demonstrates that a sulfur functional silane treated clay can be used as a substitute for a precipitated silica, treated or untreated with a silane, in a rubber composition without a loss in modulus value or significant loss in tensile strength.

Examples 37–40

These Examples compare vinyl, thiocyanato and diamino functional silane treated clays at a filler loading of 100 phr in a peroxide cured nitrile rubber. The complete nitrile rubber formulation is shown in Table 11. The treated clay filler used in the rubber composition of Example 37 was prepared by surface treating Clay A (a fine particle size clay) with a 1% treatment level of vinyltrimethoxysilane, $(CH_3O)_3$—Si—CH=$CH_2$, (hereinafter referred to as Silane V') to yield Clay AV'. Clay AV' was made by the same production method previously used to prepare Clay AV, Example 7, except for the change in silane. In Example 7, the silane was vinyltriethoxysilane. The rubber composition of Example 38 contains the thiocyanato-functional Clay AT of Example 17.

The rubber composition of Example 39 contains silane treated Clay BD which was prepared in the following manner. A 23% aqueous solution of a diamino silane, specifically N-[3-(trimethoxysilyl)propyl]ethylenediamine, (hereinafter referred to as Silane D) was intimately mixed with the dry airfloat Clay B using a dry solid/liquid mixing device to yield a 1% treatment of silane on clay. After mixing, the silane-treated clay was dried to remove residual

TABLE 10

Comparison of Clay AT (1% Silane T) to Various Silicas in Sulfur Cured Nitrile Rubber

| Compound Identification | EX. 32 | EX. 33 | EX. 34 | EX. 35 | EX. 36 |
|---|---|---|---|---|---|
| Sulfur Cured Nitrile Rubber Formulations (phr) | | | | | |
| | Prpt'd silica | Prpt'd silica - w/ Silane B | Natural silica | Natural silica - w/ Silane B | Clay AT (1% Silane T) |
| Butadiene-acrylonitrile copolymer | 100.00 | 100.00 | 100.00 | 100.00 | 100.00 |
| Prpt'd silica (Ultrasil VN3 SP[1]) | 60.00 | — | — | — | — |
| Prpt'd silica w/ Silane B (Coupsil VP 8113[2]) | — | 60.00 | — | — | — |
| Natural silica (Sillitin Z86[2]) | — | — | 100.00 | — | — |
| Natural silica treated with Silane B (Aktisil PF-216[2]) | — | — | — | 100.00 | — |
| Clay AT (1% Silane T) | — | — | — | — | 100.00 |
| Dioctylsebacate | 10.00 | 10.00 | 10.00 | 10.00 | 10.00 |
| Zinc oxide | 5.00 | 5.00 | 5.00 | 5.00 | 5.00 |
| Polymerized 1,2-dihydro-2,2,4-trimethylquinoline | 2.00 | 2.00 | 2.00 | 2.00 | 2.00 |
| Zinc strearate | 1.00 | 1.00 | 1.00 | 1.00 | 1.00 |
| Tetramethylthiuram disulfide | 2.00 | 2.00 | 2.00 | 2.00 | 2.00 |
| N-Cyclohexyl-2-benzothiazylsulfenamide | 1.00 | 1.00 | 1.00 | 1.00 | 1.00 |
| Sulfur | 0.50 | 0.50 | 0.50 | 0.50 | 0.50 |
| Totals | 181.50 | 181.50 | 221.50 | 221.50 | 221.50 |
| Physical Properties | | | | | |
| Cured Time (min.) @ 160° C. | 20:00 | 20:00 | 20:00 | 20:00 | 20:00 |
| Durometer (Shore A) (pts.) | 83 | 77 | 65 | 69 | 69 |
| Tensile Strength (psi) | 3060 | 3360 | 1390 | 1510 | 2990 |
| Elongation, % | 920 | 382 | 722 | 583 | 713 |
| Modulus @ 100% Elongation (psi) | 280 | 500 | 260 | 400 | 540 |
| Compression Set 22 hrs. @ 100° C. Deflection (%) | 79 | 19 | 25 | 15 | 14 |
| Compression Set 70 hrs. @ 100° C. Deflection (%) | 87 | 28 | 34 | 21 | 19 |
| Compression Set 22 hrs. @ 125° C. Deflection (%) | 91 | 34 | 28 | 22 | 18 |
| Compression Set 70 hrs. @ 125° C. Deflection (%) | 94 | 44 | 40 | 31 | 28 |

[1]Degussa Corp., Ridegfield Park, NJ
[2]Struktol Co., Stow, OH moisture and pulverized. The rubber composition of Example 40 contains the silane treated Clay CV of Example 16 (Table 7), where Clay C is a waterwashed, delaminated clay.

Comparative performance data of the vinyl, thiocyanato and diamino functional silane-treated clays in this peroxide cured nitrile rubber are shown in Table 12. The Shore A hardness was approximately equal for all four Examples though silane treated Clays AV' and AT yielded rubber compositions with higher tensile strengths than the diaminosilane treated Clay BD or the vinylsilane treated Clay CV. The vinyl-functional Clay AV' yielded a rubber composition which had a particularly high modulus at 100% elongation and very low compression set indicating that vinylsilane, Silane V', is the best suited silane for enhancing the reinforcing properties of fine particle size clays like Clay A in this peroxide-cured nitrile rubber. Example 40 using Clay CV (which is treated with a similar vinylsilane) also provides high modulus and excellent compression set properties although its tensile strength is reduced because of the relatively coarse particle size nature of Clay C. Nevertheless, silane treated Clay CV is an excellent filler choice when barrier resistance properties are needed in addition to reinforcement properties. The gas barrier properties of delaminated clays are well known in the prior art. This comparative data also demonstrates the vastly improved modulus values, tensile strengths and compression set properties when using the inventive vinyl or sulfur functional silane treated clays of the invention versus aminosilane treated clays, i.e., Clay BD.

TABLE 11

Peroxide Cured Nitrile Rubber Formulation (phr)

| | |
|---|---|
| Butadiene-acrylonitrile copolymer | 100.00 |
| Treated Clay | 100.00 |
| Dioctylsebacate | 10.00 |
| Zinc oxide | 5.00 |
| Polymerized 1,2-dihydro-2,2,4-trimethylquinoline | 2.00 |
| Zinc stearate | 1.00 |
| 40% Bis(t-butylperoxy-isopropyl)benzene/CaCO$_3$ | 6.00 |
| Total | 224.00 |

TABLE 12

Evaluation of Clay AV', Clay AT, Clay BD and Clay CV in a Peroxide Cured Nitrile Rubber
Physical Properties

| Compound Identification | EX. 37 | EX. 38 | EX. 39 | EX. 40 |
|---|---|---|---|---|
| Treated Clay used in Nitrile Rubber | Clay AV' (1% Silane V') | Clay AT (1% Silane T) | Clay BD (1% Silane D) | Clay CV (1.1% Silane V) |
| Cured Time (min.) @ 160° C. | 20:00 | 20:00 | 20:00 | 20:00 |
| Durometer (Shore A) (pts.) | 74 | 74 | 72 | 74 |
| Tensile Strength (psi) | 2360 | 2290 | 1910 | 1480 |
| Elongation, % | 380 | 413 | 345 | 320 |
| Modulus @ 100% Elong. (psi) | 950 | 810 | 810 | 940 |
| Compression Set 22 hours @ 100° C. Deflection (%) | 12 | 18 | 21 | 16 |
| Compression Set 70 hours @ 100° C. Deflection (%) | 19 | 26 | 29 | 23 |
| Compression Set 22 hours @ 125° C. Deflection (%) | 15 | 28 | 29 | 29 |
| Compression Set 70 hours @ 125° C. Deflection (%) | 22 | 34 | 39 | 33 |

Examples 41–44

These Examples compare the rubber reinforcing properties of some fine particle size clays (untreated and silane treated versions) to a semi-reinforcing carbon black in a polychloroprene formulation as described in Table 13. In order to best compare the performance of these different fillers, they were used in amounts that provided essentially constant Durometer hardness.

The rubber compound of Example 43, incorporating silane treated Clay AT of Example 17, provided the highest modulus values of all Examples while the SRF carbon black containing formulation, Example 44, provided the highest tensile strength and best compression set. Comparing the tensile strength and moduli of the three treated clay containing formulations, namely Examples 41–43, the test data indicate improved reinforcement with increased levels of silane treatment. The notable differences in compression set appear to be more related to the type of clay used rather than showing a high degree of dependence on silane treatment. Clay A (a waterwashed clay) and Clay B (an airfloat clay) are both fine particle size clays. Surprisingly, the rubber compound of Example 41 (containing untreated Clay A) has better compression set properties than the compound of Example 42 (containing silane treated Clay BM) despite the lack of any surface treatment. Clay BM is a mercaptosilane treated airfloat clay produced in accordance with Example 8, except that the level of mercaptosilane applied here was 0.5% rather than 1.0% by weight. Again, using the Clay AT as a reinforcing filler shows properties, particularly modulus values, on a par with carbon black.

TABLE 13

Comparison of Various Clays and Carbon Black in Polychloroprene

| | EX. 41 | EX. 42 | EX. 43 | EX. 44 |
|---|---|---|---|---|
| | Polychloroprene Formulations (phr) | | | |
| Filler used in Polychloroprene rubber | Clay A | Clay BM (0.5% Silane M) | Clay AT (1% Silane T) | SRF Carbon Black |
| Polychloroprene | 100.00 | 100.00 | 100.00 | 100.00 |
| Clay A | 100.00 | — | — | — |
| Clay BM (0.5% Silane M) | — | 100.00 | — | — |
| Clay AT (1% Silane T) | — | — | 100.00 | — |

TABLE 13-continued

Comparison of Various Clays and Carbon Black in Polychloroprene

|  | EX. 41 | EX. 42 | EX. 43 | EX. 44 |
|---|---|---|---|---|
| SRF Carbon Black | — | — | — | 60.00 |
| Stearic acid | 1.00 | 1.00 | 1.00 | 1.00 |
| Zinc oxide | 5.00 | 5.00 | 5.00 | 5.00 |
| Magnesium oxide | 4.00 | 4.00 | 4.00 | 4.00 |
| Ethylenethiourea | 0.50 | 0.50 | 0.50 | 0.50 |
| Total | 210.50 | 210.50 | 210.50 | 170.50 |
| Physical Properties | | | | |
| Rheometer (T = 90%) (min.) @ 160° C. | 30:36 | 29:18 | 32:00 | 23:00 |
| Cured Time (min.) @ 160° C. | 25:00 | 25:00 | 25:00 | 25:00 |
| Durometer (Shore A) (pts.) | 80 | 78 | 78 | 76 |
| Tensile strength (psi) | 1980 | 2010 | 2180 | 3130 |
| Elongation, % | 690 | 630 | 370 | 230 |
| Modulus @ 100% | 740 | 870 | 1270 | 920 |

TABLE 13-continued

Comparison of Various Clays and Carbon Black in Polychloroprene

|  | EX. 41 | EX. 42 | EX. 43 | EX. 44 |
|---|---|---|---|---|
| Elong. (psi) | | | | |
| Modulus @ 300% Elong. (psi) | 950 | 1270 | 2130 | — |
| Compression Set 22 hours @ 100° C. Deflection (%) | 26 | 45 | 29 | 15 |

Examples 45–48

These Examples compare the rubber performance properties of several different silane treated clays, namely Clay AT produced at various treatment levels of Silane T ranging from 0.2% to 1.0% and Clay BM treated with 0.5% of Silane M (from Example 42), in isoprene rubber. All the silane treated clays derived from Clay A and Silane T were prepared via clay slurry treatment with the appropriate silane dispersion fluid followed by spray-drying as previously described. The isoprene rubber formulation used in this study is the same as that previously described in Table 2, which incorporates 75 phr of treated clay. Examples 45–48 are listed in Table 14 in order of increasing silane treatment level. Most all the moduli and tear values in Table 14 increase in the same order as increasing silane treatment level on clay thereby making the compound of Example 48 the most highly reinforced composition in this isoprene study. The silane treated clays used in the IR compounds of Examples 45–47 are very representative of the fillers commercially available in the marketplace. The advantages shown by Example 48 therefore demonstrate the improvements in reinforcement provided by the silane treated clays of this invention relative to those of the prior art.

TABLE 14

Clay AT and Clay BM in Isoprene Rubber Physical Properties

|  | EX. 45 | EX. 46 | EX. 47 | EX. 48 |
|---|---|---|---|---|
| Sample Description | Clay AT (0.2% Silane | Clay AT (0.4% | Clay BM (0.5% Silane | Clay AT (1% Silane |
| Rheometer (T = 90%) (min.) @ 160° C. | 5:35 | 6:13 | 5:10 | 5:25 |
| Mooney Viscosity (ML 1 + 4) @ 132° C. | 36.0 | 33.8 | 34.0 | 36.2 |
| Scorch @ 5 point rise (min.) | 12:24 | 13:06 | 9:54 | 12:09 |
| Durometer (Shore A) (pts.) | 64 | 64 | 64 | 65 |
| Tensile (psi) | 3490 | 3310 | 3760 | 3620 |
| Elongation, % | 460 | 470 | 460 | 450 |
| Modulus @ | | | | |
| 100% Elongation (psi) | 580 | 550 | 640 | 700 |
| 200% Elongation (psi) | 1030 | 1100 | 1150 | 1350 |
| 300% Elongation (psi) | 1590 | 1640 | 1770 | 2040 |
| Tear Die "C" (pli) | 305 | 319 | 346 | 352 |
| Tear Die "B" (pli) | 813 | 861 | 891 | 930 |

Examples 49–51

These Examples once again compare the reinforcing properties of silane treated Clay AT, which has been surface treated with different levels of Silane T at 0.2%, 0.4% and 1.0% respectively, in the sulfur-cured white sidewall tire formulation of Table 15. All these silane treated clays were prepared via clay slurry treatment with the appropriate silane dispersion fluid of Silane T followed by spray-drying as previously described. Rubber performance results are compiled in Table 16. Examples 49–51 are listed in order of increasing silane treatment level on clay. The rubber compound of Example 51, which contains Clay AT having the highest level of silane treatment, exhibits the best overall reinforcement properties as the resulting moduli, tear, and heat build-up properties are all improved. Shore A hardness, abrasion, and compression set properties are approximately the same for all Examples. Once again it should be pointed out that the silane treated clays in the compounds of Examples 49 and 50 are very representative of the fillers commercially available and used in the marketplace. The performance advantages shown by Example 51 therefore demonstrate the improvements in reinforcement provided by the silane treated clays of this invention relative to those of the prior art. In addition, the greater reinforcement provided by our silane treated Clay AT of 1% treatment level is derived from providing greater cross-link density to the compound which is also known to have a positive effect on reducing UV crazing properties. UV exposure testing has confirmed that the rubber compound of Example 51 provides the best anti-crazing properties. The UV crazing properties of white sidewall formulations is an important customer aesthetic consideration to manufacturers of white sidewall or raised white letter tires.

TABLE 15

White Sidewall Tire Formulation (phr)

| | |
|---|---|
| Chlorinated isobutylene-isoprene | 60.00 |
| Ethylene-propylene copolymer | 20.00 |
| Polyisoprene | 20.00 |
| Treated clay | 65.00 |
| Titanium dioxide | 25.00 |
| Paraffin wax | 3.00 |
| Stearic acid | 1.00 |
| Sodium aluminosulfosilicate | 0.20 |
| Phenol-novolac resin | 4.00 |
| Zinc oxide | 5.00 |
| Amylphenol disulfide | 1.30 |
| 2,2'-Dithiobis(benzothiazole) | 1.00 |
| Sulfur | 0.50 |
| Total | 206.00 |

TABLE 16

Clay AT Evaluation in a White Sidewall Tire Formulation Physical Properties

| | EX. 49 | EX. 50 | EX. 51 |
|---|---|---|---|
| Treated Clay used in White Sidewall rubber | Clay AT (0.2% Silane | Clay AT (0.4% Silane | Clay AT (1% Silane |
| Rheometer (T = 90%) (min.) @ 160° C. | 17:45 | 18:05 | 16:43 |
| Mooney Viscosity (ML 1 + 4) @ 121° C. | 27.3 | 27.9 | 29.0 |
| Scorch @ 5 point rise (min.) | 8:58 | 8:48 | 7:46 |
| Durometer (Shore A) (pts.) | 59 | 59 | 60 |
| Tensile (psi) | 1730 | 1630 | 1440 |
| Elongation, % | 600 | 550 | 490 |
| Modulus @ | | | |
| 100% Elongation (psi) | 360 | 370 | 430 |
| 200% Elongation (psi) | 620 | 690 | 820 |
| 300% Elongation (psi) | 820 | 930 | 1080 |
| Tear Die "C" (pli) | 232 | 237 | 271 |
| Tear Die "B" (pli) | 474 | 482 | 510 |
| Compression Set 22 hours @ 100° C. Deflection (%) | 45.2 | 43.3 | 42.7 |
| Abrasion (abrasive index) | 139 | 147 | 139 |
| Goodrich Flexure @ 50° C. (ΔT-°C./min.) | 77/25 | 89/22 | 67/15 |
| % Static Deflection | 28.0 | 29.1 | 27.1 |
| % Dynamic Deflection | 38.4 | 40.0 | 28.9 |
| % Compression Set | 17.8 | 20.3 | 6.3 |
| DMA, tan δ @ | | | |
| −30° C. | 0.431 | 0.510 | 0.329 |
| 23° C. | 0.405 | 0.361 | 0.413 |
| 60° C. | 0.223 | 0.205 | 0.208 |

Examples 52–55

These Examples compare the rubber reinforcement properties of a fine particle size clay (namely Clay A) after its surface treatment with three different organo-functional silanes (Silanes D, T and V respectively) in a peroxide cured EPDM rubber formulation which is shown in Table 17. In this study, all the silane treated clays derived from Silanes T or V were prepared via clay slurry treatment with the appropriate silane dispersion fluids followed by spray-drying as previously described. Silane treated Clay AD (1% Silane D) was prepared in an analogous fashion to Clay BD of Example 39 except that dry Clay A was used in place of a dry airfloat clay (Clay B). Rubber performance data are compiled in Table 18. The rubber compounds of Example 54 (with Clay AT, 1% Silane T) and Example 55 (with Clay AV, 1% Silane V) both provide superior performance properties as compared to the rubber compounds of Examples 52 and 53 in virtually all categories including Shore A hardness, tensile strength, moduli, tear, compression set and heat build-up properties. The silane treated clays in the compounds of Examples 52 and 53 are representative of treated fillers commercially available and used in the marketplace. This test program thereby indicates that the type of organo-functional silane, as well as the silane treatment level used are important for reinforcement properties in this peroxide cured EPDM rubber. It is also very interesting to note the excellent rubber performance properties of Clay AT (1% Silane T) given that Silane T is a sulfur-functional thiocyanatosilane. Such sulfur-functional silanes are usually thought to be most useful in providing reinforcement in sulfur-cured rubber systems, not peroxide cured systems. This feature obviously points out the unique dual performance capabilities of Clay AT.

TABLE 17

EPDM Rubber Formulation (phr)

| | |
|---|---|
| Ethylene-propylene-diene polymer | 100.00 |
| Treated Clays | 130.00 |
| Carbon Black N-330 | 5.00 |
| Naphthenic petroleum oil | 50.00 |
| Zinc oxide | 5.00 |
| Stearic acid | 1.00 |
| 40% Dicumylperoxide/CaCO$_3$ | 6.80 |
| Dibenzoyl-p-quinone dioxime | 3.50 |
| Total | 301.30 |

TABLE 18

Evaluation of Treated Clays in a Peroxide Cured EPDM Rubber
Physical Properties

| | EX. 52 | EX. 53 | EX. 54 | EX. 55 |
|---|---|---|---|---|
| Treated Clay in EPDM rubber | Clay AD (1% Silane D) | Clay AT (0.4% Silane T) | Clay AT (1% Silane T) | Clay AV (1% Silane V) |
| Cured Time (min.) @ 160° C. | 30:00 | 30:00 | 30:00 | 30:00 |
| Durometer (Shore A) (pts.) | 53 | 52 | 55 | 55 |
| Tensile (psi) | 670 | 750 | 1000 | 1000 |
| Elongation, % | 520 | 510 | 440 | 470 |
| Modulus @ | | | | |
| 100% Elong. (psi) | 230 | 260 | 320 | 340 |
| 200% Elong. (psi) | 400 | 470 | 650 | 660 |
| 300% Elong. (psi) | 520 | 600 | 850 | 820 |
| Tear Die "C" (pli) | 103 | 104 | 139 | 128 |
| Compression Set 22 hours @ 100° C. Deflection (%) | 46.6% | 47.7% | 37.8% | 37.8% |
| Compression Set 70 hours @ 100° C. Deflection (%) | 62.2% | 61.2% | 52.2% | 52.7% |
| Goodrich Flexure @ 50° C. (ΔT-°C./min.) | 43/18 | 46/18 | 33/11 | 33/13 |
| % Static Deflection | 34.1 | 33.2 | 31.7 | 30.1 |
| % Dynamic Deflection | 34.3 | 34.0 | 28.4 | 26.9 |
| % Compression Set | 8.51 | 8.27 | 5.03 | 4.93 |

We claim:

1. A treated clay product comprising a hydrous kaolin clay powder, a surface of the powder treated with a functional silane selected from the group consisting of a sulfur functional silane in an amount between about 0.7 and 5.0% by weight based on dry clay and a vinyl functional silane in an amount between about 0.2 and 5.0% by weight based on dry clay, the powder having a residual surfactant level on the surface thereof after said hydrous kaolin clay powder has been surface treated and dried.

2. The treated clay product of claim 1 wherein the amount of the sulfur functional silane and the amount of the vinyl functional silane each range between about 1.0 and 2.0% by weight based on dry clay.

3. The treated clay product of claim 1 wherein the functional silane is the sulfur functional silane.

4. The treated clay product of claim 3 wherein the sulfur functional silane is a silicon compound represented by a formula selected from the group consisting of:

(RO)$_2$R'—Si—X wherein R represents a methyl group or an ethyl group, R' represents a methyl group, an ethyl group, a methoxyl group or an ethoxyl group, and X represents a mercaptopropyl group or a thiocyanatopropyl group, and (RO)$_3$—Si—(CH$_2$)$_3$—SSSS—(CH$_2$)$_3$—Si(OR)$_3$ wherein R represents a methyl group or an ethyl group.

5. The treated clay product of claim 1 wherein the functional silane is the vinyl functional silane.

6. The treated clay product of claim 5 wherein the vinyl functional silane is a silicon compound represented by a formula selected from the following formulas:

(RO)$_2$R'—Si—X wherein R represents a methyl group or an ethyl group, R' represents a methyl group, an ethyl group, a methoxyl group or an ethoxyl group, and X represents a vinyl group.

7. The treated clay product of claim 1 wherein the hydrous kaolin clay is one of a waterwashed kaolin clay or an airfloat kaolin clay.

8. The treated clay product of claim 7 wherein the hydrous kaolin clay is one of a waterwashed kaolin clay having a fine particle size of at least 90% less than 2 microns as determined by a x-ray Sedigraph and a waterwashed, delaminated kaolin clay.

9. The treated clay product of claim 1 wherein the residual surfactant level ranges between 10 ppm and 5000 ppm based on dry clay.

10. A method of making a treated clay product comprising the steps of:
   a) providing a hydrous kaolin clay powder;
   b) surface treating said hydrous kaolin clay powder with an amount of a functional silane selected from the group consisting of a sulfur functional silane wherein the amount is between about 0.7 and 5.0% by weight based on dry clay and a vinyl functional silane wherein the amount is between about 0.2 and 5.0% by weight based on dry clay, wherein the functional silane is pre-dispersed or emulsified in water using a surfactant prior to adding the functional silane to the hydrous kaolin clay powder; and
   c) heat-drying said surface treated clay as needed to yield a dry product having a residual surfactant level thereon.

11. The method of claim 10 wherein the amount of the sulfur functional silane and the amount of the vinyl functional silane each range between about 1.0 and 2.0% by weight based on dry clay.

12. The method of claim 10 wherein the functional silane is the sulfur functional silane.

13. The method of claim 12 wherein the sulfur functional silane is a silicon compound represented by a formula selected from the group consisting of:

(RO)$_2$R'—Si—X wherein R represents a methyl group or an ethyl group, R' represents a methyl group, an ethyl group, a methoxyl group or an ethoxyl group, and X represents a mercaptopropyl group or a thiocyanatopropyl group, and (RO)$_3$—Si—(CH$_2$)$_3$—SSSS—(CH$_2$)$_3$—Si(OR)$_3$ wherein R represents a methyl group or an ethyl group.

14. The method of claim 10 wherein the functional silane is the vinyl functional silane.

15. The method of claim 14 wherein the vinyl functional silane is a silicon compound represented by a formula selected from the following formulas:

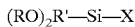

(RO)$_2$R'—Si—X wherein R represents a methyl group or an ethyl group, R' represents a methyl group, an ethyl group, a methoxyl group or an ethoxyl group, and X represents a vinyl group.

16. The method of claim 10 wherein the hydrous kaolin clay is one of a waterwashed kaolin clay or an airfloat kaolin clay.

17. The method of claim 16 wherein the hydrous kaolin clay is one of a waterwashed kaolin clay having a fine particle size of at least 90% less than 2 microns as determined by a x-ray Sedigraph and a waterwashed, delaminated kaolin clay.

18. The method of claim 10 wherein the surfactant has a HLB value of 8–18.

19. The method of claim 18 wherein the amount of surfactant employed is 0.5–10 parts by weight with respect to 100 parts by weight of the functional silane.

20. The method of claim 10 wherein the surfactant is a non-ionic surfactant.

21. The method of claim 20 wherein the amount of surfactant employed is 0.5–10 parts by weight with respect to 100 parts by weight of the functional silane.

22. The method of claim 10 wherein said hydrous kaolin clay powder is made in slurry form and said functional silane is pre-dispersed in water using a non-ionic surfactant and said hydrous kaolin clay slurry is well mixed with said dispersed functional silane and then heat-dried to form said surface treated hydrous kaolin clay.

23. The method of claim 10 wherein the surfactant is non-ionic, has a HLB value ranging between 8 and 18 and has a concentration of about 0.5 to 10 parts by weight of surfactant based on 100 parts by weight of the functional silane.

24. The method of claim 23 wherein the surfactant is selected from the group consisting of ether and ester compounds having polyoxyethylene or polyhydric alcohols as their hydrophilic groups.

25. The method of claim 24 wherein the surfactant is selected from the group consisting of polyoxyethylene alkyl ethers, polyoxyethylene fatty acid esters, polyoxyethylene alkylphenyl ethers, polyhydric alcohol fatty acid esters, and polyoxyethylene polyhydric alcohol fatty acid esters.

26. The method of claim 25 wherein the surfactant is one of PEG-20 sorbitolmonolaurate and 20-EO ethoxylated nonylphenol.

27. A treated clay product comprising a waterwashed kaolin clay powder, a surface of the powder treated with a sulfur functional silane comprising one of bis(3-triethoxysilypropyl)tetrasulfane, a mercaptosilane and a thiocyanatosilane wherein an amount of said sulfur functional silane ranges between 1.0 and 2.0% by weight based on dry clay, the powder having a residual surfactant level on the surface thereof after said hydrous kaolin clay powder has been surface treated and dried.

28. A treated clay product comprising a waterwashed kaolin clay powder, a surface of the powder treated with a vinyl functional silane comprising one of a vinyltrimethoxysilane and a vinyltriethoxysilane, wherein an amount of said vinyl functional silane ranges between 1.0 and 2.0% by weight of dry clay, the powder having a residual surfactant level on the surface thereof after said hydrous kaolin clay powder has been surface treated and dried.

29. The method of claim 10 wherein the emulsion is adjusted to be alkaline when using the sulfur functional silane and is adjusted to be one of the acidic and alkaline when using the vinyl functional silane.

* * * * *